(12) United States Patent
Holley et al.

(10) Patent No.: US 9,282,156 B2
(45) Date of Patent: Mar. 8, 2016

(54) ARCHITECTURE AND METHOD OF CALL ROUTING BASED ON SESSION INITIATION PROTOCOL PRESENCE INFORMATION

(75) Inventors: Kerrie L. Holley, Montara, CA (US);
Sriram Ramanathan, Lutz, FL (US);
Muralidhar Seelam, Orlando, FL (US);
Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 1231 days.

(21) Appl. No.: 12/256,233

(22) Filed: Oct. 22, 2008

(65) Prior Publication Data

US 2010/0099418 A1 Apr. 22, 2010

(51) Int. Cl.
*H04W 40/00* (2009.01)
*H04L 29/08* (2006.01)
*H04L 12/725* (2013.01)
*H04L 29/06* (2006.01)
*H04W 4/02* (2009.01)

(52) U.S. Cl.
CPC .............. *H04L 67/24* (2013.01); *H04L 45/308* (2013.01); *H04L 65/1006* (2013.01); *H04L 65/1069* (2013.01); *H04W 4/023* (2013.01); *H04L 67/18* (2013.01); *H04W 4/02* (2013.01); *H04W 4/021* (2013.01)

(58) Field of Classification Search
CPC ....... H04W 4/02; H04W 4/008; H04W 4/021;
H04W 4/028; H04W 4/023; H04W 8/005;
H04W 12/02; H04W 48/16; H04W 4/025;
H04W 4/04; H04W 4/22; H04W 48/04;
H04W 48/18; H04W 64/00; H04W 36/18;
H04W 36/32

USPC ........... 455/445, 413, 426.2, 560; 379/88.17,
379/88.19, 201.01, 211.01; 709/230;
370/389, 401
See application file for complete search history.

(56) References Cited

U.S. PATENT DOCUMENTS

| 5,999,595 A | 12/1999 | Shaffer et al. |
| 6,393,288 B1 | 5/2002 | Sollee et al. |
| 6,459,774 B1 | 10/2002 | Ball et al. |
| 6,865,259 B1 | 3/2005 | Shaffer et al. |

(Continued)

FOREIGN PATENT DOCUMENTS

| EP | 1519552 | 3/2005 |
| KR | 10-0448636 | 9/2004 |

(Continued)

OTHER PUBLICATIONS

Information Materials for IDS dated Mar. 11, 2011.

(Continued)

*Primary Examiner* — Nimesh Patel
(74) *Attorney, Agent, or Firm* — Schmeiser, Olsen & Watts, LLP; Matthew Chung

(57) ABSTRACT

An architecture and method of call routing is provided based on session initiated protocol presence information of a callee. The method includes providing a computer infrastructure operable to: receive presence information of a callee upon detecting when the callee is within a certain proximity; and provide call routing information to at least one callee designated device based on customized rules provided by the callee and correlated to the presence information of the callee. The presence information is updated by a SIP based notification.

24 Claims, 3 Drawing Sheets

(56) References Cited

U.S. PATENT DOCUMENTS

| | | | |
|---|---|---|---|
| 6,996,212 | B1 | 2/2006 | Baker et al. |
| 7,298,833 | B2 | 11/2007 | Kein et al. |
| 2004/0043793 | A1* | 3/2004 | Sakata ............................ 455/560 |
| 2004/0172254 | A1* | 9/2004 | Sharma et al. .............. 704/270.1 |
| 2006/0023658 | A1 | 2/2006 | Phillips et al. |
| 2006/0072726 | A1* | 4/2006 | Klein et al. ............... 379/201.01 |
| 2006/0264208 | A1 | 11/2006 | Moon et al. |
| 2007/0008963 | A1* | 1/2007 | Hoffmann ..................... 370/389 |
| 2007/0058789 | A1* | 3/2007 | Lim et al. .................... 379/88.17 |
| 2007/0216761 | A1* | 9/2007 | Gronner et al. ............. 348/14.02 |
| 2009/0106437 | A1* | 4/2009 | Mostafa et al. ............... 709/230 |
| 2009/0163201 | A1* | 6/2009 | Wormald .................... 455/426.2 |
| 2010/0159890 | A1* | 6/2010 | Sigmund et al. .............. 455/413 |
| 2010/0215157 | A1* | 8/2010 | Narayan et al. ............ 379/88.19 |

FOREIGN PATENT DOCUMENTS

| | | | |
|---|---|---|---|
| WO | 2006036356 | | 4/2006 |
| WO | 2006135591 | | 12/2006 |
| WO | WO 2007086038 A1 * | 8/2007 | .............. H04L 12/58 |

OTHER PUBLICATIONS

J. Peterson NeuStar, "RFC4119—A Presence-based GEOPRIV Location Object Format", Dec. 2005.

Wu et al.; "SIP Presence Location Service," Proc. SATNAC 2005, Drakensberg, South Africa, (2005) 6 pages.

* cited by examiner

ARCHITECTURE AND METHOD OF CALL ROUTING BASED ON SESSION INITIATION PROTOCOL PRESENCE INFORMATION

FIELD OF THE INVENTION

The invention generally relates to a method and system of call routing and, in particular, to an architecture and method of call routing based on session initiated protocol presence information of a callee.

BACKGROUND

Faced with an increasingly difficult challenge in growing both average revenue per user (ARPU) and numbers of subscribers, network carriers are trying to develop a host of new products, services, and business models based on data services. One such service is call routing and voice mail services. While a lot of advances have been made in the Value Added Services (VAS) domain in general and voice mail technology in particular (to some extent revealed by the fact that basic voicemail services are essentially given away for free by most wireless and operators and many wire-line operators), not much has been accomplished in the callee centric control area.

Callee-centric services include presence-based interactive communication services. In such services, the callees can publish, in real time, their presence information to callers (presence watchers) subscribing to the service. For example, a message can be generated and transmitted to the caller based on the callee's presence information, but this is limited in scope. Illustratively, existing presence systems provide only limited callee presence information to the caller in a response message. Furthermore, the callee is not able to control the content of missed call response messages according to different authorities or priorities granted to the caller by the callee. That is, current presence systems do not allow a callee to provide different presence information to different callers.

Accordingly, there exists a need in the art to overcome the deficiencies and limitations described hereinabove.

SUMMARY

In a first aspect of the invention, a method comprises receiving presence information of a callee upon detecting when a callee is within a certain proximity. The method further comprises providing call routing information to at least one callee designated device based on customized rules provided by the callee and correlated to the presence information.

In another aspect of the invention, a computer program product is provided which comprises a computer usable storage medium having readable program code tangibly embodied in the storage medium. The computer program product being operable to: receive customized rules from a callee related to at least one of call routing and message greetings; and update call routing information to at least one callee designated device based on the customized rules and correlated presence information of the callee. The update call routing information is integrated with a SIP based IMS infrastructure which allows for implementation in an IMS core network.

In another aspect of the invention, a method provides a call routing application. The method comprises providing a computer infrastructure being operable to: receive presence information of a callee upon detecting when the callee is within a certain proximity; and provide call routing information to at least one callee designated device based on customized rules provided by the callee and correlated to the presence information of the callee. The presence information is updated by a SIP based notification.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
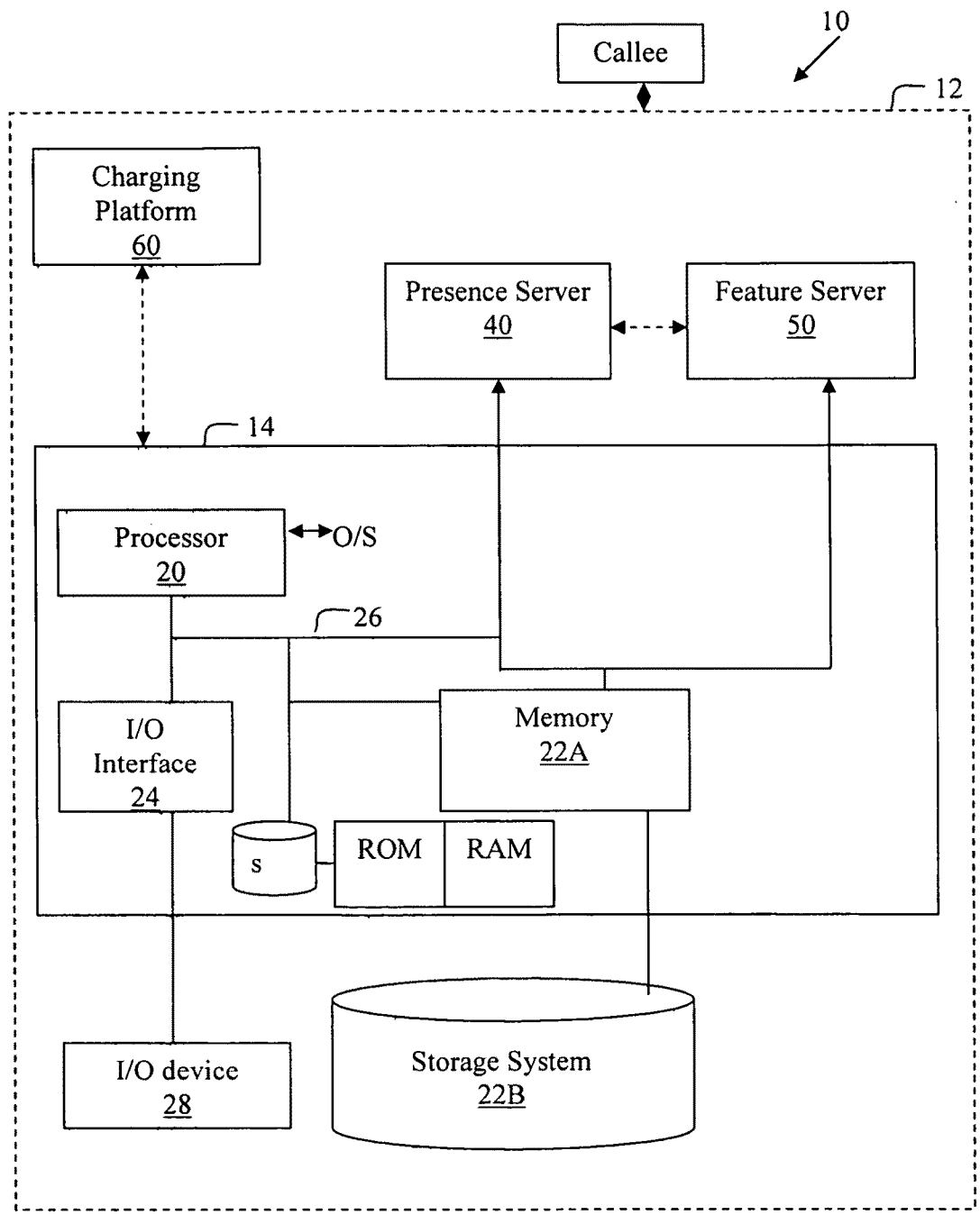
FIG. 1 shows an illustrative environment for implementing processes in accordance with the present invention.

The invention generally relates to a method and system of call routing and, in particular, to an architecture and method of call routing based on session initiated protocol presence information. Advantageously, the present invention allows a callee (person receiving the call) to configure call routing rules in a highly customizable manner that will ensure the callee is always reachable via telephone (or other device such as, for example, a cellular telephone of the callee) irrespective of the location of the callee. In embodiments, the highly customizable preferences can be based on, for example, a location of the callee, and can be configured to any number of different callers based on callee defined rules. For example, the callee can configure routing and greeting options based on the callee's location, as discussed in further detail below.

More specifically, the present invention focuses on allowing the customization of a voicemail greeting or call routing by the callee, on a per caller basis, based on a set of vXML controls that are used along with network provided location and presence context. The present invention provides the callee fine grained control over the dynamic creation of a context sensitive greeting that is played back to the caller, allowing for the callee to configure, for example, specific greetings on a call by call basis. This allows for subsequent caller behavior modification, including that of leaving a voicemail. Also, this allows for callee controlled based filtering on a caller by caller basis to allow, for example, two callers receiving entirely different messages or routed to different devices based on presence information (location) of the callee and pertinent to that caller. In this way, the system and method of the invention is primarily callee centric, based on a set of preferences that is setup by the callee, amongst other features. The present invention is also configured to integrate seamlessly into an IMS network for routing as well as charging facilities while continuing to support callers from the Public Switched Telephone Network (PSTN).

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:
- a portable computer diskette,
- a hard disk,
- a random access memory (RAM),
- a read-only memory (ROM),
- an erasable programmable read-only memory (EPROM or Flash memory),
- a portable compact disc read-only memory (CDROM), and/or
- an optical storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server 12 that can perform the processes described herein. In particular, the server 12 includes a computing device 14. The computing device 14 can be resident on a carrier network infrastructure or other third party service provider (any of which is generally represented in FIG. 1).

The computing device 14 includes a presence server 40 and a feature server 50 (both of which can be a module or program control) configured to make the computing device 14 operable to perform the services described herein. The presence server 40 and feature server 50 can be one or more computing modules on the same or different computing infrastructure, and can be implemented by a service provider such as, for example, a network carrier as discussed in greater detail below. By using this system and methodology, the network carrier will not have to make any significant infrastructure investments, as the preexisting infrastructure is utilized with the present invention.

The implementation of the environment 10 provides an efficient way to integrate a presence zone detector application (shown in FIG. 2), presence server 40, session initiation protocol (SIP) servlet and a feature server 50 such as, for example, BroadSoft® (BroadSoft is a registered trademark of BROADSOFT, INC. in the U.S.). For example, the computing device 14 can factor in location as a node of a presence document in the presence server 40 using Session Initiation Protocol enabled signaling for seamless integration into an IP Multimedia subsystem network.

More specifically, the illustrative environment 10 provides the following functionality, amongst others described herein.
- Allows a callee to setup profiles in the feature server 50. The profiles contain call routing information of the callee based on presence information of the callee. For example, the callee can setup a profile with routing rules for specific telephone numbers to be called when the callee is, e.g., in the office or out of office. The routing rules may be set up for different callers.
- Detects the presence of a callee based on, for example, Bluetooth™ detection technology, GPS, A-GPS or tri-angulation methodologies and updates the presence server 40 using the location information of the callee (Bluetooth is a trademark of BLUETOOTH SIG, INC.) using Session Initiation Protocol (SIP) notification. Upon detection of the callee, the callee's presence information will be updated in the presence server 40 which, in turn, will cause the application to change the user profile in the feature server 50.
- Provides the ability to subscribe to the presence server 40 using a SIP subscribe message. The presence information that is used is present as a SIP "Notify" from the presence server 40, which is an efficient implementation that supports scalability and higher throughputs.
- Processes the SIP notification message from the presence server 40 when a publish is made into the presence server 40, and communicates with the feature server 50 to modify the feature server 50 profile.
- Ensures that the call routing to the callee's preferred device occurs in accordance to the feature server 50 profile.

In implementation, the illustrative environment 10 can change a callee profile in the feature server 50 based on a callee's presence information, e.g., based on the user's location and customized rules. The callee can change the profiles directly in the feature server 50 or through the presence server 40. Advantageously, the presence information is determined prior to a call being received; that is, presence information that is used is already present as a SIP "Notify" from the presence server, which is more efficient and supports scalability and higher throughputs.

The illustrative environment 10 can be used to set up preferences, e.g., rules, profiles, etc. of the callee, which may be saved in the storage system 22B. The storage system 22B, in embodiments, can be a database resident on the feature server 50. The preferences can include caller white lists, as well as a host of filters. The filters allow for different levels of granularity such as, for example, time of day controls, caller identity based customizations, caller greetings based on user (e.g., callee) location information, as well as presence on multiple channels that include Extensible Messaging and Presence Protocol (XMPP) supported public IM gateways. It is thus contemplated by use of the callee controlled filters that a specific caller or set of callers can be processed according to geo-boundary specified location, presence and time of day preferences, etc. according to a set of callee defined rules. In this way, depending on the granularity of the filter, fine grained control allows a callee to specify specific actions and rules to be applied to each caller on a case by case basis, e.g., allowing the callee to make alternate channel decisions on the fly. (The present invention explicitly allows for an indication as to the available callee channel, e.g., if the callee is away from the office, their mobile device could be specified as one such alternate channel, factored into the greeting that is played.) Also, filtering or other rules allow for different callers receiving entirely different messages or routed to different devices based on presence information (location) of the callee and pertinent to that caller.

The illustrative environment 10 can also include visual palette driven controls which allow easy insertion of vXML clips into the greeting, for example. These visual palette driven controls can be provided on the I/O display 28. The I/O device 28 can be, for example, any device that enables an individual to interact with the computing device 14 or any device that enables the computing device 14 to communicate with one or more other computing devices using any type of communications link. The external I/O device/resource 28 may be for example, a display of a computing device such as a personal digital assistant (PDA).

The illustrative environment 10 thus allows the customization of a voicemail greeting or call routing by the callee, on a per caller basis. This customization can be based on a set of vXML controls. The illustrative environment 10 also permits fine grained control over the dynamic creation of a context sensitive greeting that is played back to the caller by allowing the callee to configure, for example, specific greetings or routing on a call by call basis using filters, location information and white-lists (preferred callers or groups of callers).

In embodiments, the illustrative environment 10 can use location based geo-boundary information to provide location based customizations such as, for example, routing a call to a specific location of the callee, informing the caller that certain devices are inactive based on the absence of the callee at such location, etc. This geo-boundary location information can be obtained from Bluetooth technology, GPS, A-GPS or triangulation methodologies, all known to those of skill in the art such that further explanation is not required herein for an understanding of the invention. Geo-boundary driven location publication is supported as part of a presence document, allowing for more efficient integration and abstraction of the actual location platform exposed protocol (e.g., Open LS).

The illustrative environment 10 can use SIP signaling to control presence information including the integration to external presence sources such as a public IM gateway (using Extensible Messaging and Presence Protocol (XMPP)), as well as integration to known presence sources inside the core telecommunications network, e.g., connectivity to a public switched telephone network (PSTN) via a Breakout Gateway Control Function (BCGF).

In one illustrative non-limiting implementation, the environment 10 integrates the feature server 50 and the presence server 40 to enable call routing to be performed by the feature server 50 based on the location of the user (e.g., callee). In this example, the feature server 50 can change the user profile, per callee instructions (profiles) so that a call to the user can be routed based on the user profiles that are set up in feature server 50. The location of the callee, i.e. whether the callee is in the vicinity, is determined using Bluetooth detection technology, GPS, A-GPS or triangulation methodologies. The triangulation, A-GPS or GPS can implement known location platforms such that current presence information can be factored into dynamic generation of the greeting or routing at runtime. If the callee is detected to be within a certain vicinity, e.g., the callee's office, the environment 10 updates the presence information of the callee into the presence server 40. This, in turn, causes the application to update the callee profile in the feature server 50. The feature server 50, from then on, routes the calls according to the rules that were set up by the callee for the updated profile.

In yet another embodiment, the system and method provides a charging platform 60 to provide charging models for services rendered. The charging platform 60 may be maintained, deployed, created and/or serviced by the service provider. The charging platform 60 is designed to generate a charging record for services rendered to a subscriber, e.g., the callee will be charged for the services rendered based on the charging model implemented by the system and method of the invention. In embodiments, the service provider can calculate an amount to be charged, based on many different considerations and generate the charging record to be sent to the charging platform 60. In turn, the charging platform 60 can generate an invoice and/or deduct a usage charge from an account of the subscriber (callee). The charging platform 60 also supports flexible charging models supported via an IMS compliant Customer Care Framework (CCF). This allows for the flexible application of charging models by downstream mediation, rating, billing and settlement platforms to support the full breadth of business models.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

In general, the processor 20 executes computer program code, which is stored in the memory 22A and/or storage system 22B. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., the computer infrastructure that performs the process steps of the invention for one or more customers. The customers may be, for example, a callee. In return, the service provider can receive payment from the customer(s) under a subscription and/or fee agreement and/or the service provider can receive payment.

Exemplary Architecture

Figure 2:
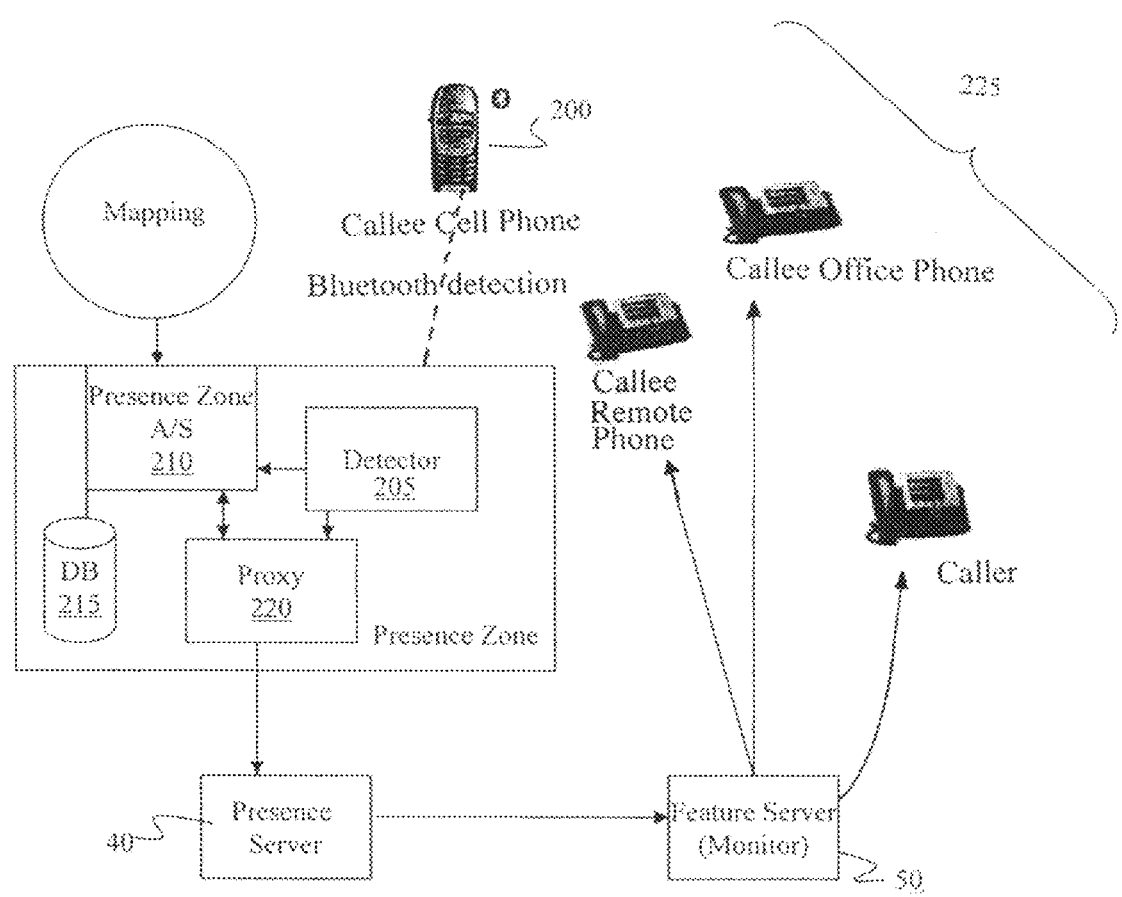
FIG. 2 shows an exemplary architect implementing aspects of the present invention.

FIG. 2 shows an exemplary architecture in accordance with aspects of the invention. In particular, FIG. 2 shows a mobile device 200, e.g., representing the callee in communication with a Bluetooth detector 205. The mobile device 200 may be, for example, a Bluetooth enabled cellular telephone. The architecture further includes a presence zone component 210 and related database 215. The presence zone component 210 is configured to update presence information, amongst other information, in the presence server 40. The presence server 40, in turn, communicates with the feature server 50 to provide presence information for call routing, greeting and availability services.

In embodiments, the Bluetooth detector 205 is capable of detecting when the callee is within a certain vicinity or location, as well as detecting a MAC address of the mobile device 200. In other embodiments, the Bluetooth detector 205 can be substituted with a location platform, e.g., GPS, A-GPS or triangulation methods, which is capable of determining a location and identity of the callee.

The presence zone component 210 correlates the MAC ID to the actual callee's device. That is, the presence zone component 210 can map the MAC address to a corresponding device. In one embodiment, the presence zone component 210 is configured to map the MAC address to a SIP Uniform Resource Identifier (URI) by using the server component of the presence zone component 210. In alternative embodiments, a proxy application web interface 220 may be used to map the device ID to a URI. The URI is a compact string of characters used to identify or name a resource. The main purpose of this identification is to enable interaction with representations of the resource over a network using specific protocols. The database 215 (also referred to as storage system 22B on FIG. 1) can store the callee's preferences, e.g., rules, filters, etc., as well as information related to the caller ID in order to update presence information in the presence server 40.

The location of the mobile device 200 may be updated to the presence server 40 by the presence zone component 210 or the proxy application web interface 220. Thus, upon detection of the mobile device 200 for which the mapping exists, the location information (e.g., presence information) and, e.g., any related rules, can be published a SIP message to the presence server 40. In embodiments, the presence zone component 210 (or proxy application web interface 220) publishes a SIP message to the presence server 40 when the mobile device 200 (whose mapping to a SIP URI is already performed) leaves the vicinity.

The profile information, e.g., presence information, can then be updated in the feature server 50 by the presence server 40. For example, the call routing application includes a SIP servlet that is subscribed to the presence server 40, i.e., the SIP servlet subscribes to the interested SIP URI's. The siplet receives the notification for an interested URI and it updates the profile information in the feature server 50. The feature server 50, in turn, is used for call routing functionality to any of a plurality of devices 225 capable of receiving presence documents. The presence integration can thus use a telecommunications network housed presence platform, e.g., presence server 40, that is plugged into multiple presence sources, both from inside the telecommunications network as well as external sources such as a public SMPP based Instant Messaging Gateway.

In embodiments, the rules may be, for example, stored in the feature server 50, or provided to the feature server by any component of the computing infrastructure of FIG. 1. The rules may be, for example, call routing, greeting messages, e.g., "I am away from the office, please leave a message or call my cellular telephone at 555-555-5555, etc. In embodiments, the rules may be provided by VoiceXML (VXML), which is a format for specifying interactive voice dialogues between a human and a computer. In embodiments, the VoiceXML documents can be updated and interpreted by a voice browser resident on the presence zone component 210, presence server 40 and/or feature server 50. A common architecture is to deploy voice browsers attached to the PSTN so that callee can use a telephone to interact with voice applications.

In one example, the callee profile along with call routing information resident in the feature server 50 can be sent to the plurality of devices 225 based on a location of the callee. That is, the feature server 50 can provide call routing, greetings, activity and inactivity messages to name a few, to any of the devices 225 according to the routing rules that are setup in the feature server 50 and based on the location of the callee. These rules will be provided to any device 225 capable of receiving presence documents with greetings, availability information of the callee, or a host of other features. The plurality of devices 225 are preferably compatible with presence information systems.

Exemplary Processes

Figure 3:
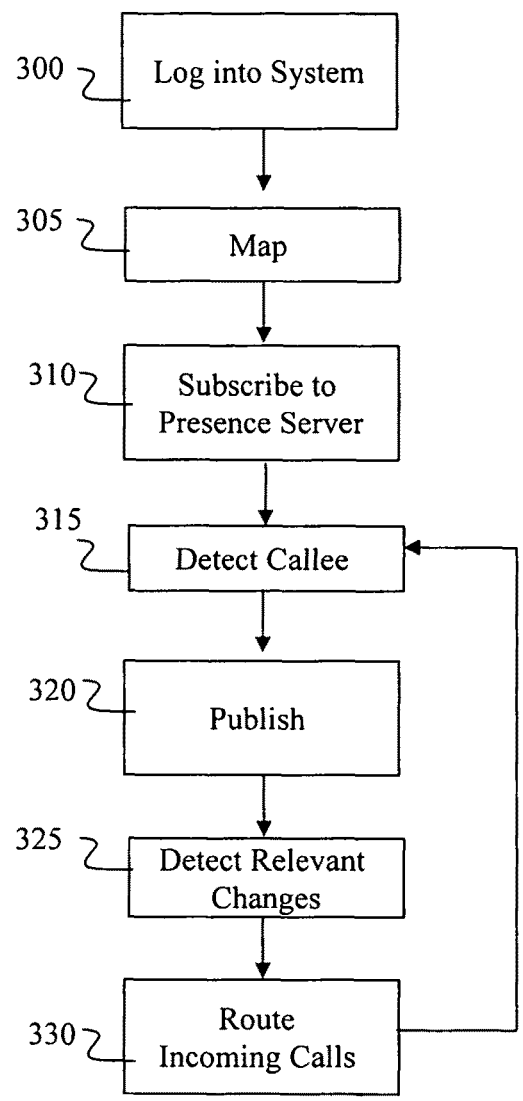
FIG. 3 is a flow diagram showing a process in accordance with aspects of the present invention.

FIG. 3 illustrates exemplary processes in accordance with the present invention. The steps of FIG. 3 may be implemented on the computer infrastructure of FIG. 1 and/or the architecture of FIG. 2, for example. The flow diagram in FIG. 3 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flow diagrams, and combinations of the flow diagrams illustrations can be implemented by special purpose hardware-based systems that perform the specified functions or acts, or combinations of special purpose hardware and computer instructions and/or software, as described above.

Additionally, the invention can take the form of an entirely hardware embodiment, an entirely software embodiment or an embodiment containing both hardware and software elements. Software includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Referring to FIG. 3, at step 300, a user logs into the feature server and sets up call routing rules (or greetings) that need to applied to incoming calls. These call routings rules may be a status, for example, "Available: In office" and "Unavailable". At step 305, the device ID is mapped to a URI using, for example, a proxy application web interface. At step 310, a watcher application (SIP Servlet) of the feature server subscribes to the presence server to receive notifications for a URI. At step 315, the user (e.g., callee) is detected to be at a certain location. The detection may occur by a Bluetooth proximity detector detecting an appropriate Bluetooth enabled device. The Bluetooth proximity detector can communicate this information to the proxy application. In embodiments, at step 320, the proxy application (or presences zone component, for example) publishes the presence information to the presence server. At step 325, the watcher application (SIP servlet) detects relevant changes in the callee status and changes the call routing n the feature server. At step 330, the feature server routes the incoming calls of the user in accordance to the routing rules that are setup, e.g., "Available: In office" profile.

In embodiments, the process can revert back to step 315 in order to continue detecting the location of the callee. For example, at step 315, as the callee leaves the vicinity, e.g., desk area, the Bluetooth proximity detector detects the Bluetooth ID is out of proximity and communicates with the proxy application. At step 320, the proxy application (or presences zone component, for example) will map the device ID to the URI and publish the presence information to the presence server (user away from office). At step 325, the watcher application (SIP servlet) detects relevant changes in the callee status and changes the call routing. At step 330, the feature server routes the incoming calls of the user in accordance to the routing rules that are setup for the "Unavailable" profile.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. While the invention has been described in terms of embodiments, those skilled in the art will recognize that the invention can be practiced with modifications and in the spirit and scope of the appended claims.

What is claimed is:

1. A method, said method comprising:
   detecting, by a presence zone component in a computer system via a Bluetooth detector in a computer system that comprises one or more processors, a mobile device of a callee at a present location of the callee, said detecting the mobile device comprising determining the present location of the callee;
   in response to said detecting the mobile device, said presence zone component publishing via the one or more processors, to a presence server in a special purpose computing device in the computer system, a session initiation protocol (SIP) message comprising the present location of the callee, said presence server storing presence information of the callee, said special purpose computing device particularized for implementing the method;
   receiving, by the presence server from the presence zone component via the one or more processors, the SIP message comprising the present location of the callee;
   updating, by the one or more processors, the callee's presence information in the presence server to include the present location of the callee;
   communicating, by presence server via the one or more processors, the updated presence information to a feature server in the computing device, said feature server storing a user profile that includes the callee's call routing information, said call routing information based on customized rules for processing calls from a plurality of callers to the callee designated device and sending messages to the plurality of callers in response to the calls, said customized rules including a rule for sending different messages to different callers of the plurality of callers, said different messages based on the present location of the callee; and
   changing, by a call routing application in the feature server via the one or more processors, the user profile based on the updated presence information.

2. The method of claim 1, wherein the customized rules include a rule specifying a context sensitive greeting in the messages to be sent to the plurality of callers, and wherein the context sensitive greeting is specific to a listed group of callers.

3. The method of claim 1, wherein the customized rules including a rule based on time of day.

4. The method of claim 1, wherein a message to be sent to the callers include a greeting to be sent the plurality of callers, and wherein the customized rules include a rule that factors a channel of a mobile device of the callee into the greeting.

5. The method of claim 1, wherein a message to be sent to the callers includes content informing the callers that specified devices are inactive based on an absence of the callee at specified locations.

6. The method of claim 1, wherein the method further comprises:
   said one or more processors providing information pertaining to an availability of services with respect to the present location of the callee.

7. A computer program product, comprising one or more computer readable hardware storage devices storing computer readable program code executable by one or more processors of a computer system to implement a method, said method comprising:
   detecting, by a presence zone component in the computer system via a Bluetooth detector in the computer system, a mobile device of a callee at a present location of the callee, said detecting the mobile device comprising determining the present location of the callee;
   in response to said detecting the mobile device, said presence zone component publishing via the one or more processors, to a presence server in a special purpose computing device in the computer system, a session initiation protocol (SIP) message comprising the present location of the callee, said presence server storing presence information of the callee, said special purpose computing device particularized for implementing the method;
   receiving, by the presence server from the presence zone component via the one or more processors, the SIP message comprising the present location of the callee;
   updating, by the one or more processors, the callee's presence information in the presence server to include the present location of the callee;
   communicating, by presence server via the one or more processors, the updated presence information to a feature server in the computing device, said feature server storing a user profile that includes the callee's call routing information, said call routing information based on customized rules for processing calls from a plurality of callers to the callee designated device and sending messages to the plurality of callers in response to the calls, said customized rules including a rule for sending different messages to different callers of the plurality of callers, said different messages based on the present location of the callee; and
   changing, by a call routing application in the feature server via the one or more processors, the user profile based on the updated presence information.

8. The computer program product of claim 7, wherein the customized rules include a rule specifying a context sensitive greeting in the messages to be sent to the plurality of callers, and wherein the context sensitive greeting is specific to a listed group of callers.

9. The computer program product of claim 7, wherein the customized rules including a rule based on time of day.

10. The computer program product of claim 7, wherein a message to be sent to the callers include a greeting to be sent the plurality of callers, and wherein the customized rules include a rule that factors a channel of a mobile device of the callee into the greeting.

11. The computer program product of claim 7, wherein a message to be sent to the callers includes content informing the callers that specified devices are inactive based on an absence of the callee at specified locations.

12. The computer program product of claim 7, wherein the method further comprises:
   said one or more processors providing information pertaining to an availability of services with respect to the present location of the callee.

13. A computer system comprising one or more processors, one or more memories, and one or more computer readable storage devices, said one or more storage devices containing program code executable by the one or more processors via the one or more memories to implement a method, said method comprising:
   detecting, by a presence zone component in the computer system via a Bluetooth detector in the computer system, a mobile device of a callee at a present location of the callee, said detecting the mobile device comprising determining the present location of the callee;
   in response to said detecting the mobile device, said presence zone component publishing via the one or more processors, to a presence server in a special purpose computing device in the computer system, a session initiation protocol (SIP) message comprising the present location of the callee, said presence server storing presence information of the callee, said special purpose computing device particularized for implementing the method,
   receiving, by the presence server from the presence zone component via the one or more processors, the SIP message comprising the present location of the callee;
   updating, by the one or more processors, the callee's presence information in the presence server to include the present location of the callee;
   communicating, by presence server via the one or more processors, the updated presence information to a feature server in the computing device, said feature server storing a user profile that includes the callee's call routing information, said call routing information based on customized rules for processing calls from a plurality of callers to the callee designated device and sending messages to the plurality of callers in response to the calls, said customized rules including a rule for sending different messages to different callers of the plurality of callers, said different messages based on the present location of the callee; and
   changing, by a call routing application in the feature server via the one or more processors, the user profile based on the updated presence information.

14. The computer system of claim 13, wherein the customized rules include a rule specifying a context sensitive greeting in the messages to be sent to the plurality of callers, and wherein the context sensitive greeting is specific to a listed group of callers.

15. The computer system of claim 13, wherein the customized rules including a rule based on time of day.

16. The computer system of claim 13, wherein a message to be sent to the callers include a greeting to be sent the plurality of callers, and wherein the customized rules include a rule that factors a channel of a mobile device of the callee into the greeting.

17. The computer system of claim 13, wherein a message to be sent to the callers includes content informing the callers that specified devices are inactive based on an absence of the callee at specified locations.

18. The computer system of claim 13, wherein the method further comprises:

said one or more processors providing information pertaining to an availability of services with respect to the present location of the callee.

19. A process for supporting computer infrastructure, said process comprising providing at least one support service for at least one of creating, maintaining, supporting, and deploying computer-readable program code in a computer system that comprises one or more processors, wherein the program code is stored in one or more computer readable hardware storage devices, and wherein the program code in combination with the computer system is configured to perform a method, said method comprising:

- detecting, by a presence zone component in the computer system via a Bluetooth detector in the computer system, a mobile device of a callee at a present location of the callee, said detecting the mobile device comprising determining the present location of the callee;
- in response to said detecting the mobile device, said presence zone component publishing via the one or more processors, to a presence server in a special purpose computing device in the computer system, a session initiation protocol (SIP) message comprising the present location of the callee, said presence server storing presence information of the callee, said special purpose computing device particularized for implementing the method;
- receiving, by the presence server from the presence zone component via the one or more processors, the SIP message comprising the present location of the callee;
- updating, by the one or more processors, the callee's presence information in the presence server to include the present location of the callee;
- communicating, by presence server via the one or more processors, the updated presence information to a feature server in the computing device, said feature server storing a user profile that includes the callee's call routing information, said call routing information based on customized rules for processing calls from a plurality of callers to the callee designated device and sending messages to the plurality of callers in response to the calls, said customized rules including a rule for sending different messages to different callers of the plurality of callers, said different messages based on the present location of the callee; and
- changing, by a call routing application in the feature server via the one or more processors, the user profile based on the updated presence information.

20. The process of claim 19, wherein the customized rules include a rule specifying a context sensitive greeting in the messages to be sent to the plurality of callers, and wherein the context sensitive greeting is specific to a listed group of callers.

21. The process of claim 19, wherein the customized rules including a rule based on time of day.

22. The process of claim 19, wherein a message to be sent to the callers include a greeting to be sent the plurality of callers, and wherein the customized rules include a rule that factors a channel of a mobile device of the callee into the greeting.

23. The process of claim 19, wherein a message to be sent to the callers includes content informing the callers that specified devices are inactive based on an absence of the callee at specified locations.

24. The process of claim 19, wherein the method further comprises:

- said one or more processors providing information pertaining to an availability of services with respect to the present location of the callee.

* * * * *